United States Patent [19]
Hubbard

[11] 3,809,438
[45] May 7, 1974

[54] PNEUMATIC CONVEYING APPARATUS
[75] Inventor: Elbert G. Hubbard, Hillside, Ill.
[73] Assignee: Arbeck Industrial & Mining Equipment Co. Limited, Scarborough, Ontario, Canada
[22] Filed: Mar. 22, 1973
[21] Appl. No.: 343,861

[52] U.S. Cl............... 302/22, 302/37, 302/59, 55/340, 55/407
[51] Int. Cl. ... B65g 53/28, B65g 53/40, B65g 53/60
[58] Field of Search............ 302/17, 21, 22, 28, 35, 302/37, 38, 59, 62; 55/340, 406, 407

[56] References Cited
UNITED STATES PATENTS

| | | | |
|---|---|---|---|
| 3,236,565 | 2/1966 | Kester et al. | 302/21 X |
| 1,380,698 | 6/1921 | Anspach et al. | 302/59 X |
| 1,280,780 | 10/1918 | Lob | 302/35 X |
| 1,986,301 | 1/1935 | Stockton | 302/22 X |
| 2,539,109 | 1/1951 | Webb | 302/22 |
| 3,309,785 | 3/1967 | King | 302/22 X |

*Primary Examiner*—Evon C. Blunk
*Assistant Examiner*—W. Scott Carson

[57] ABSTRACT

A pneumatic conveying apparatus for particulate materials uses a multi-stage centrifugal fan energizer wherein the first stage has stationary blades of lesser diameter than the impeller, and a vented shroud. The vent is returned to a cyclone separator which is downstream from a material inlet for the particulate materials. The energizer creates a lower pressure in the conduits between the material inlet and separator and between the separator and energizer than in the return conduit between the vented shroud of the energizer and the separator. Any very fine material particles or dust that reach the energizer rather than being separated in the cyclone separator are entrapped in the shroud and returned to the separator therefrom. No filters are required for dust collection. The apparatus may be closed loop or open loop; and if it is closed loop, the pneumatic gas may be other than air.

6 Claims, 7 Drawing Figures

PNEUMATIC CONVEYING APPARATUS

FIELD OF THE INVENTION

This invention relates to material transfer and conveying systems, and particularly to an apparatus for pneumatic conveying of dry material from one place to another. The apparatus operates without the use of filter bags or other filters for cleaning the pneumatic stream, and may operate with a gas other than air.

BACKGROUND OF THE INVENTION

In the past, pneumatic conveying systems - especially those for dry materials - have been of two basic types. Either the dry materials have been moved through suitable conduits by the action of positive air pressure supplied from a point near the forward end of the conduit system, or by the action of a negative air pressure or vacuum created at a point near the outlet end of the conduit system. In pneumatic conveying systems using positive pressure, it is relatively easy to separate the dry material being conveyed from the air stream in which it is conveyed at the delivery point or discharge outlet of the conduit by utilizing suitable bag filter designs for containing the fine material. However, in such systems there are difficulties encountered in injecting the materials into the positive pressure stream, requiring the use of expensive and space-consuming equipment such as rotary feeders and the like. Such equipment has, of course, a number of working parts, and therefore requires constant maintenance and repair.

Likewise, in the known pneumatic conveying systems which operate with a vacuum, it has been necessary to provide very expensive and space-consuming separators to recover the dry material being conveyed from the pneumatic stream. In all such systems, it has been necessary to provide suitable bag filters to contain as much of the dust or very fine particles carried with the dry material as possible. In vacuum operated systems, the apparatus for injecting the material to be conveyed into the inlet end of the conduit system can be relatively simple.

In all such prior systems, however, where the dry material being conveyed becomes dusty, or has a high content of very fine particles, complete recovery of the materials from the conveying system may not be realized, with the result that an effluent from the conveying system may be extremely dusty or polluting; and also with the result that there may be significant losses of the material. Bag filters are, of course, used; but they require exchange and cleaning - with the requirement that the conveying system be shut down - and their efficiency of recovery may vary over a period of time.

Most pneumatic conveying systems of the closed loop variety i.e., ones where the same air is used continuously as the pneumatic conveying stream, have worked with a positive pressure at the inlet end of the material conveying conduit system. Pressure comes from suitable air pressure pumps or fans, and unless suitable fins, coolers or other heat exchangers are used, the compressed or pressurized air may be very hot. There are many dry materials that can be conveyed which cannot tolerate a hot pneumatic conveying stream. It is therefore desirable to provide a pneumatic conveying system of the sort which has simple material injection apparatus into the conveying stream, but also utilizing simple separator or recovery apparatus without the use of filter bags or other filter equipment. It is also desirable to provide such a pneumatic conveying system as stated immediately above which can operate either as a closed loop system - utilizing the same air or other gas as the pneumatic conveying stream - or as an open system. Primarily, it is desirable to provide such systems having extremely high recovery or separator efficiencies, and which are capable of operating continuously.

This invention provides a pneumatic conveying system which may be closed loop or open, and which utilizes an energizer for the pneumatic conveying stream which is such that very high recovery efficiencies of the material being conveyed can be realized. The energizer has at least two centrifugal fan stages with axial flow therebetween, and has a suitable shroud surrounding the impeller and stator of the first stage so that any particles of material which enter the first stage are entrapped within the shroud and recovered therefrom. The major separation and recovery of the dry materials being conveyed from the pneumatic conveying stream is effected in a cyclone separator or cyclonette of the known variety.

BRIEF SUMMARY OF THE INVENTION

It is an object of this invention to provide a pneumatic conveying system which may be either open or closed loop, and which provides extremely high recovery efficiency of dry material from the pneumatic conveying stream.

A further object of this invention is to provide a pneumatic conveying system which, when operating as a closed loop system, can use a gas other than air as the pneumatic conveying stream.

Yet another object of this invention is to provide a pneumatic conveying system for dry materials which may be easily and inexpensively produced and assembled.

BRIEF DESCRIPTION OF THE DRAWINGS

These and other features and objects of the invention are more fully discussed hereafter in association with the accompanying drawings, in which.

DESCRIPTION OF THE PREFERRED EMBODIMENTS

Figure 1:
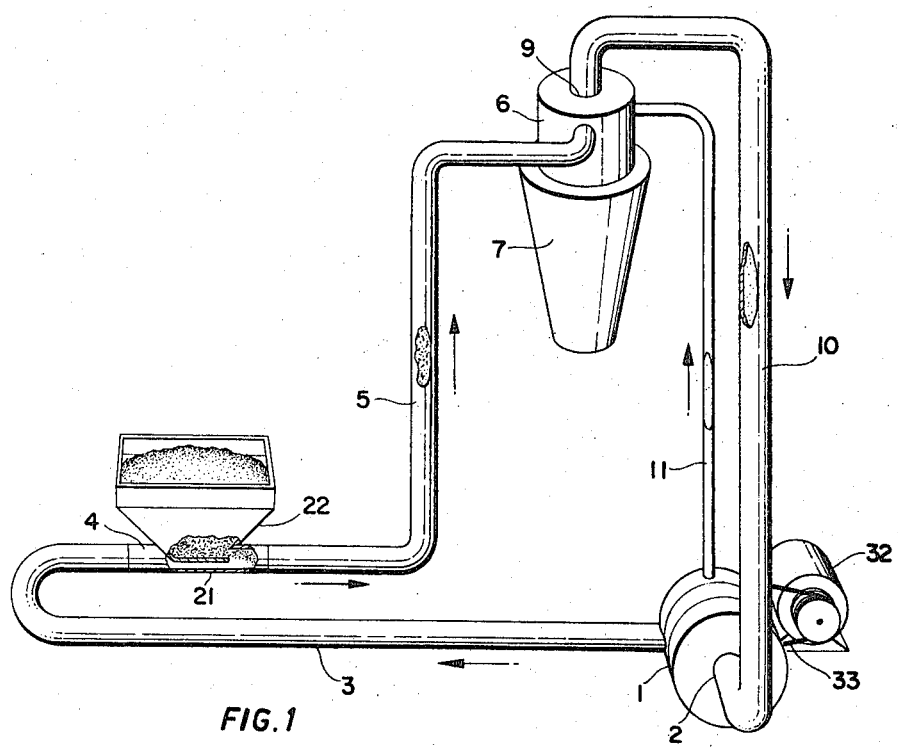
FIG. 1 is a schematic drawing showing the principle components of a closed loop pneumatic conveying apparatus according to this invention.

In FIG. 1, a multi-stage energizer of the centrifugal fan type is generally designated at 1. The energizer is discussed in greater detail hereinafter. Energizer 1 operates to produce a positive or direct pressure in conduit 3 and a vacuum or negative pressure at inlet 2 to the energizer. As will be shown hereafter, the closed loop system of FIG. 1 is essentially one which operates as a vacuum-type system, and the pressure side of energizer 1 assures that the pneumatic conveying stream will be delivered to the hopper inlet 4, at which the dry material to be conveyed is injected into conduit 5, with low pressure loss and therefore low energy loss.

As noted, the material to be conveyed is delivered from hopper 22 past an inlet baffle 21 into the conduit 5. The materials delivered from the hopper 22 may be introduced into the conduit 5 in any suitable manner, such as gravity flow, metered flow, screw conveyor etc., provided that they are fed to the end of hopper 22 communicating with the conduit 5 sufficiently closely that they are drawn in to the conduit by the pneumatic conveyor stream.

It will be readily understood that the length of the conduits may vary considerably, ranging from several feet to several hundred feet; and the design of the sizes of the conduits and the energizer 1, etc., is predicated on the conditions of the installation. It should also be noted that, without specifically excluding materials having a high moisture content, the apparatus of this invention is particularly adapted for use with materials having a moisture content less than 7 percent. In general, materials which have a moisture content higher than 7 percent are difficult to convey pneumatically because the particles tend to adhere to each other or to the inner walls of the conduits.

The materials which are introduced into the conduit 5 from hopper 22 at inlet 4 are conveyed along the length of conduit 5 to a cyclone separator indicated generally at 6. The conveying action in conduit 5 is essentially a vacuum action, and thus the pneumatic conveying stream is cool. In a closed system such as that illustrated in FIG. 1, there may be a slight pressure within the conduit system until material is introduced into conduit 5 at inlet 4, whereupon the system becomes essentially a vacuum system and any expansion of the air or other gas used as the pneumatic conveying stream would tend to cool that gas.

The speeds at which dry materials may be pneumatically conveyed within the conduit 5 from hopper 22 to cyclone separator 6 may vary considerably, and may be as high as 9,000 feet per minute.

The cyclone separator 6 is of the well known sort, such as those used in dust collectors having minimum static pressure losses with reference to the quanity of air or other gas being used as the pneumatic conveying stream. The conduit 5 leads to a first substantially tangential material inlet in the side of the cyclone, so that a centrifugal spin is imparted to the material and the pneumatic conveying stream as it enters the cyclone 6 from conduit 5. As the material is spinning inside the cyclone 6, centrifugal force holds it against the inner wall of the cycle while gravity causes the material to fall downwardly in the cyclone separator until eventually it passes from a material outlet at the bottom end of the cyclone to a material collecting apparatus such as container 7. An inverted cone 8 may be placed in the lower part of the cyclone separator 6 with a suitable clearance between its outer edge and the inner wall of the cyclone separator for the material to pass to the material outlet of the separator. The air flow which may also pass downwardly with the material is, however, under the influence of the vacuum at outlet 9; and as the air or other gas flows upwardly it forms a vortex flowing around the outer edge of the inverted cone 8, from whence it flows to the outlet 9 and into conduit 10 to the axial inlet 2 of the first stage of the energizer 1.

Depending on the particular size of the material being conveyed from hopper 22 to container 7 through the cyclone separator 6, as well as the speeds and quantities of conveying, there may be a very high separation of the material fron the pneumatic conveying stream within the separator 6. However, it may happen that not all of the material is separated; especially when the material which is being conveyed has a portion thereof with a very small particular size, or is dusty. In any event, very small particles of the material being conveyed, the material fines may be carried away from the cyclone separator 6 through conduit 10 to the energizer 1. As noted, energizer 1 is a multi-stage centrifugal fan-type energizer having axial flow between the stages and an axial flow input; and the first stage of the energizer 1 is adapted to remove such material fines as may be delivered to it from the flow of the pneumatic conveying stream.

Figure 2:
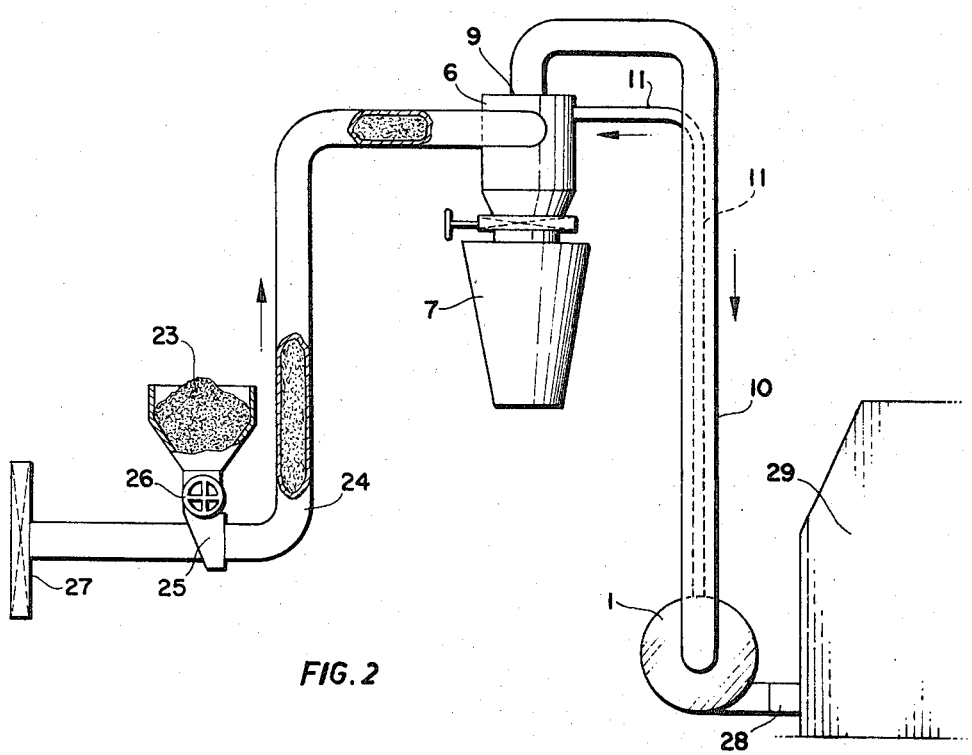
FIG. 2 is a schematic drawing showing the principle components of an open loop pneumatic conveying apparatus according to this invention.

It should first be noted, however, that the pneumatic conveying system of FIG. 2 operates essentially in identical manner as that of FIG. 1, except that the system of FIG. 2 is open whereas the system of FIG. 1 is a closed loop. That is to say, material from hopper 23 enters conduit 24 at inlet 25, possibly under the control of valve 26, and is delivered to separator 6 in the same manner as spoken of previously. The energizer 1 has a conduit 10 communicating to it from outlet 9 of the separator 6, and a further conduit 11 returning to the separator 6 as discussed hereafter. When energizer 1 is operating, a vacuum is drawn within conduit 24.

A filter 27 may be provided upstream of inlet 25 to the conduit 24 to prevent any introduction of foreign matter or other pollutents into the material being conveyed during operation of the pneumatic conveying system of FIG. 2. The output from the energizer 1 is conveyed through conduit 28 to an exhaust means 29 which may be an exhaust stack or otherwise. When the exhaust means 29 operates essentially at ambient pressure, and the downstream side of filter 27 is also at essentially the same pressure, it will be seen that the pneumatic conveying system illustrated in FIG. 2 is an open system which is essentially a vacuum system. The significant difference between that system and open, vacuum systems of the prior art is, however, the multistage energizer 1 and return conduit 11 to the cyclone separator 6, as discussed hereafter.

Figure 3:
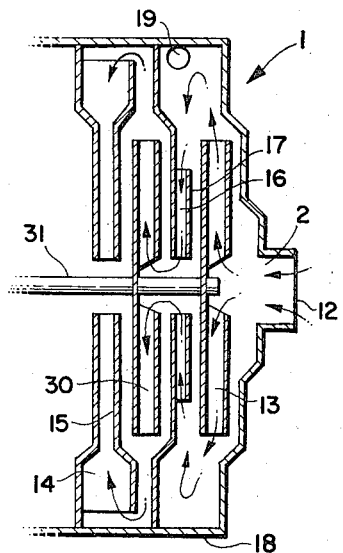
FIG. 3 is a general cross section of an energizer used in this invention.
Figure 4:
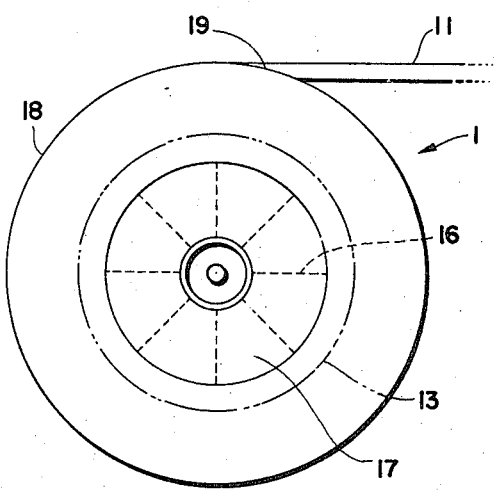
FIG. 4 is a general end view of the energizer of FIG. 3.
Figure 5:
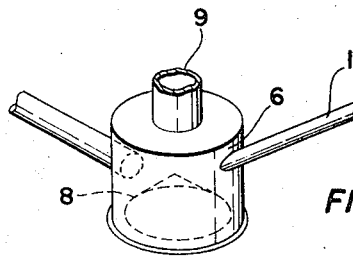
FIG. 5 is a perspective view of a cyclone separator of the sort that may be used in this invention.

Turning to FIGS. 3 and 4, there is shown a multistage energizer 1, of which the first two stages are illustrated. The first stage of the energizer 1 is used to separate the material fines or dust which may be delivered to the inlet 2 by conduit 10 from the cyclone separator 6 - in either a closed loop system such as that illustrated in FIG. 1 or an open system such as that illustrated in FIG. 2. The second and subsequent stages of the energizer 1 are used to provide the requisite pressure and thus the requisite flow of the pneumatic conveying stream as may be necessary for the proper operation of the pneumatic conveying apparatus of any particular installation in accordance with this invention.

The first stage of the energizer 1 has an axial inlet 12, impeller blades indicated generally at 13 and stator blades indicated generally at 16. The blades 16 have a face plate indicated at 17; and it will be noted that the diameter of the impeller 13 is greater than the diameter of the stator blades 16 and their face plate 17. The impeller 13 is shown in phantom lines in FIG. 4, while the stator is shown at dotted lines 16 with the face plate 17 in solid lines.

A shroud 18 surrounds the impeller 13 and stator 16 of the first stage of the energizer 1; and an aperture 19 is provided in the shroud 18 to communicate with a conduit 11.

Flow arrows in FIG. 3 show the axial input to the first stage, the centrifugal flow within the first stage to the shroud 18, the axial flow to impeller 30 of the second stage and the centrifugal flow past stator 14 having face plate 15 of the second stage. Impellers 13 and 30 are both mounted for rotation on shaft 31; and the energizer 1 may be driven such as from a motor 32 shown in FIG. 1 by such means as belt 33.

Any material fines which enter the first stage of the energizer 1 have a very small particle size; but nevertheless, each of the particles have a much higher relative density when compared to the air or other gas which is being used as the pneumatic conveying stream. Thus, as the pneumatic conveying stream impinges upon impeller 13 of the first stage of energizer 1, any particles of the dry material which are present are conveyed outwardly against the shroud 18 by the centrifugal flow from the impeller as well as by the energy imparted to the particles. Because of their high relative density, the particles tend to spin or become entrapped at the shroud 18 until they leave the shroud through aperture 19 and conduit 11.

The stator blades 16 and the face plate 17 in the first stage have a smaller diameter than the diameter of impeller 13. Thus, the entrapment or enshroudment of the air and particles on the inside of shroud 18 is enhanced because there is no abrupt change of direction of flow from the impeller 13 past stator blade 16 in the first stage as their is from impeller 30 past the stator blades 14 in the second stage, as illustrated in FIG. 3.

The pressure within the first stage of the energizer 1 communicates to conduit 11; and the other end of conduit 11 is in communication with a substantially tangential entry into the cyclone separator 6, and the vacuum therein. Thus, flow within the conduit 11 is enhanced. It will be noted that any material which enters conduit 11 and is conveyed back to the cyclone separator 6 enters the cyclone separator at a slightly higher pressure than that which enters from conduit 5; and because of the energy imparted to the particles from impeller 13 in the first stage of energizer 1, those particles may enter the cyclone separator 6 with a higher energy than particles entering from the conduit 5. Thus, even though the particles which are returned to the cyclone separator 6 by conduit 11 may have small size and low mass, they will be recovered from the pneumatic conveying stream, thereby increasing the total recovery efficiency of all of the material inserted into conduit 5 at inlet 4 - or conduit 24 at inlet 25 - to very nearly 100 percent. It will be noted that the air or other gas which leaves the second or subsequent stage of energizer 1 and is directed to conduit 3 or to exhaust 29 will have virtually no particles - even of the smallest size - of the material from hopper 22 or 23.

The rotative speed of the energizer 1 may vary from several hundred rpm to greater than 10,000 rpm, and tip speeds of the inpellers in excess of 22,000 feet per minute are not uncommon. The horsepower required to drive the energizer 1 is determined from the total flow requirements, the pressure differentials within the system, and so on.

Figure 6:
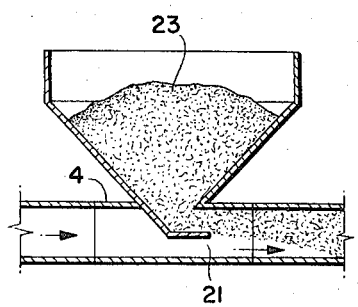
FIG. 6 is a cross section of a typical material inlet apparatus.

In either a closed loop system as in FIG. 1 or an open system as in FIG. 2, material may be fed into the conduit 5 or the conduit 24 from a hopper in a manner such as illustrated in FIG. 6, where it will be noted that the flow of the pneumatic conveying stream is directed from the left to the right side past an inlet baffle 21. A greater vacuum at the right hand side of the baffle 21 is thereby created, assuring that material is drawn from the hopper into the conduit 5 or 24 to be conveyed to the cyclone separator 6.

Figure 7:
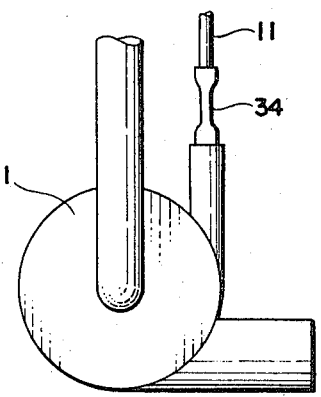
FIG. 7 is a general view of an energizer showing an alternative embodiment thereof.

The materials being conveyed within the conduit 5 or 24 may move at speeds of from 900 to 9,000 feet per minute. Thus, they have a substantial kinetic energy or momentum imparted thereto, which aids in the separation or recovery of the materials from the pneumatic conveying stream at the cyclone separator 6. Some materials which can be used in pneumatic conveying systems such as those illustrated in FIGS. 1 and 2 include dry food stuffs such as cereals, flour, starch, sugar; seeds; feed; drugs; tablets; construction materials such as sand, cement; minerals, ores; chemicals; etc. To enhance the recovery and return of particles from the shroud 18 of the first stage of energizer 1, a venturi throat may be installed in conduit 11 as shown at 34 in FIG. 7. The addition of the venturi throat in the return conduit 11 has a scavenging effect with respect to the entrapped particles within shroud 18. In addition, a plurality of return ducts 11 might be provided, each tangentially directed outwardly from the shroud 18 from a plurality of spaced apertures 19 formed therein.

When certain chemicals or dry reagents are being pneumatically conveyed using apparatus according to this invention, it may be desirable to use a gas other than air - for example, nitrogen - as the pneumatic conveying stream. When a closed loop such as that illustrated in FIG. 1 is used, it can be seen that a different than then air can easily be used provided control is maintained at the inlet 4 from the hopper 22 to preclude introduction of air into the conduit 5 when the hopper is emptied.

There has been described a pneumatic conveying apparatus which may operate either as a closed loop system with air or another gas as a pneumatic conveying stream, and which may also be operated as a open system. A cyclone separator is used, as well as an energizer having at least two stages with a return line to the separator from a shroud surrounding the first stage. Other modifications and alternatives to the apparatus may be realized, without departing from the spirit and scope of the appended claims.

What I claim is:

1. In a conveyor apparatus for pneumatic conveying of particulate materials by a pneumatic conveying stream within a conduit, from material inlet means for said particulate matter to means for separating said particulate material from the pneumatic conveying stream, the improvement comprising:

first conduit means from said material inlet means to a first substantially tangential flow inlet means of cyclone separator means;

said cyclone separator means having material outlet means at the bottom thereof and an outlet for said pneumatic conveying stream at the top thereof;

second conduit means from said pneumatic conveying stream outlet of said cyclone separator means to inlet means on energizer means for said pneumatic conveying stream;

said energizer means having at least two centrifugal fan stages with axial flow therebetween, and where said inlet means is substantially axial to the first stage;

shroud means surrounding said first stage, and arranged so that impeller means within said first stage causes centrifugal flow of said pneumatic conveying stream within said shroud; stator means and a face plate therefor within said first stage shroud arranged to re-direct said centrifugal flow away from said shroud and towards an axial inlet to the next of said at least two centrigual flow stages;

the impeller of said first stage having a greater diameter than the face plate of said stator means within said first stage shroud;

outlet means in said first stage shroud connected to third conduit means;

said third conduit means being connected for pneumatic flow to second substantially tangential flow inlet means of said cyclone separator means;

where said energizer acts to create a lower pressure of said pneumatic conveying stream in said first and second conduit means than in said third conduit means, and said third conduit means is arranged to convey any particulate material entrapped in said first stage shroud to said second inlet means of said cyclone separator.

2. The apparatus of claim 1, further comprising fourth conduit means from the outlet of the last of said at least two stages of said energizer means to said material inlet means.

3. The apparatus of claim 2 where said pneumatic conveying stream is a gas other than air.

4. The apparatus of claim 1, further comprising filter means interposed between the ambient and said material inlet means to said first conduit means.

5. The apparatus of claim 4, further comprising exhaust means in communication with the outlet of the last of said at least two stages of said energizer means.

6. The apparatus of claim 1, further comprising venturi throat means interposed in said third conduit means between said first stage shroud and said second inlet to said cyclone separator.

* * * * *